(12) United States Patent
McPeak et al.

(10) Patent No.: US 12,363,116 B2
(45) Date of Patent: Jul. 15, 2025

(54) GUARDRAIL ENFORCEMENT ENGINE FOR IMPORTED ELECTRONIC RESOURCES

(71) Applicant: Resourcely Inc., San Jose, CA (US)

(72) Inventors: Travis MacLeod McPeak, San Jose, CA (US); Alaeddin Saleh Abdelrahman Almubayed, Berkeley, CA (US)

(73) Assignee: Resourcely Inc., San Jose, CA (US)

( * ) Notice: Subject to any disclaimer, the term of this patent is extended or adjusted under 35 U.S.C. 154(b) by 139 days.

(21) Appl. No.: 18/339,767

(22) Filed: Jun. 22, 2023

(65) Prior Publication Data

US 2024/0039916 A1    Feb. 1, 2024

Related U.S. Application Data

(60) Provisional application No. 63/433,378, filed on Dec. 16, 2022, provisional application No. 63/394,131, filed on Aug. 1, 2022.

(51) Int. Cl.
*H04L 9/40* (2022.01)
*G06F 3/06* (2006.01)
*G06F 16/21* (2019.01)

(52) U.S. Cl.
CPC ............ *H04L 63/10* (2013.01); *G06F 3/0604* (2013.01); *G06F 3/0631* (2013.01); *G06F 3/067* (2013.01); *G06F 16/214* (2019.01); *H04L 63/102* (2013.01); *H04L 63/20* (2013.01)

(58) Field of Classification Search
CPC ....... H04L 63/10; H04L 63/102; H04L 63/20; H04L 63/107; H04L 63/101; G06F 3/0604; G06F 3/0631; G06F 3/067; G06F 16/214
See application file for complete search history.

(56) References Cited

U.S. PATENT DOCUMENTS

| | | | | |
|---|---|---|---|---|
| 8,424,053 | B2 * | 4/2013 | Gottimukkala | H04L 41/28 713/153 |
| 10,084,818 | B1 * | 9/2018 | Roth | H04L 63/20 |
| 11,140,061 | B1 | 10/2021 | Sanders et al. | |
| 11,989,429 | B1 * | 5/2024 | Abrol | G06F 3/0605 |

(Continued)

OTHER PUBLICATIONS

PCT International Search Report and Written Opinion, PCT Application No. PCT/US2023/25978, Nov. 6, 2023, 25 pages.

(Continued)

*Primary Examiner* — El Hadji M Sall
(74) *Attorney, Agent, or Firm* — Fenwick & West LLP

(57) ABSTRACT

A policy enforcement application receives input specifying policy constraints for resources of a given type. The application imports a pre-existing resource into the policy enforcement application, and determines, by the policy enforcement application, that the pre-existing resource is of the given type. Responsive to determining that the pre-existing resource is of the given type, the application determines that the pre-existing resource does not comply with the policy constraints. The application determines an owner of the resource based on metadata associated with the resource, and prompts the owner with a set of recommended configuration changes. Responsive to receiving a selection of a selectable option from the owner, the application reconfigures the resource with the recommended configuration changes.

20 Claims, 10 Drawing Sheets

(56) References Cited

U.S. PATENT DOCUMENTS

| | | |
|---|---|---|
| 2009/0205011 A1 | 8/2009 | Jain et al. |
| 2018/0123795 A1* | 5/2018 | Norman ............... H04L 63/00 |
| 2021/0166247 A1 | 6/2021 | Sirigiri et al. |
| 2021/0271633 A1 | 9/2021 | Aksionkin et al. |
| 2021/0303684 A1 | 9/2021 | Makhlevich et al. |
| 2022/0094600 A1 | 3/2022 | Khoo et al. |
| 2022/0171869 A1 | 6/2022 | Chin et al. |

OTHER PUBLICATIONS

PCT Invitation to Pay Additional Fees, PCT Application No. PCT/US2023/025978, Sep. 5, 2023, 2 pages.

\* cited by examiner

500

$ resourcely create s3 "my-bucket"

Hi, in order to create a secure S3 bucket, we need to collect more context!

What is your team name?

What is the purpose of this bucket?

Is your bucket going to store any of the following data? (Select all that Apply)

[X] PII

[X] EU citizen data

[ ] Financial Data

[ ] Corporate Data

>>Based on what you provided so far, this S3 bucket required to be deployed in EU region, other regions require approval Which region would you like to deploy the bucket at?

[X] eu-west-1 (default – does not require approval)

[ ] Other (requires approval)

What bucket access would you like to create?

[X] Private (default – does not require approval)

[ ] Public (requires approval)

Thank you, please hold on!
generating terraform and submitting github pull request . . . !

PR link: https://github.com/Resourcely-Inc/terraform/pull/15

FIG. 5

Blueprints

Create and manage which blueprints your developers can use to create cloud resources.

Search by: Name, type, keywords ....

Sort By: Newest

Filter By

---

AWS SIMPLE STORAGE SERVICE (S3)
AWS Bucket (private, intranet)

S3 bucket configured to be accessible only from VPN connected machines

---

GOOGLE CLOUD STORAGE
GCP Storage (highly sensitive)

Google Cloud Object store to host highly sensitive data

---

AWS SIMPLE STORAGE SERVICE (S3)
AWS Bucket (public)

S3 bucket configured to store public data

STEP 2 OF 3

Configure and provide details

← Back

Continue →

Configure Resource

Name*
[{project}-{env}]

☑ Uniform bucket level access

☑ Versioning enabled

Project* [ ]

Provide context

Env* [ ▼ ]
What is the environment for this resource?

Owner* [ ]
Who is the primary contact for this data?

Quota* [ $ ]
How many gigabytes of data do you expect to store?

Team* [ ]
What team manages this data?

GUARDRAIL ENFORCEMENT ENGINE FOR IMPORTED ELECTRONIC RESOURCES

CROSS REFERENCE TO RELATED APPLICATIONS

This application claims the benefit of U.S. Provisional Application No. 63/394,131, filed Aug. 1, 2022 and U.S. Provisional Application No. 63/433,378, filed Dec. 16, 2022, the disclosures of which are hereby incorporated by reference herein in their entireties.

TECHNICAL FIELD

The disclosure generally relates to the field of computing resource configuration, and more specifically relates to importing computing resources into a policy enforcement environment.

BACKGROUND

In a typical resource development scenario, a developer of a service creates one or more computing resources. An operations team of the service then reviews the computing resource and determines whether it complies with operations policies (e.g., the resource is deployed in an authorized geographical location; the resource has security set up based on a policy governing personal identifying information (PII) where the resource contains PII, etc.). A security service then scans the resource for vulnerabilities and policy breaches and identifies security issues to the developers. These issues bottleneck developer progress, and add network and compute bloat in security scans and unnecessary communications between the parties that, at scale, can create massive inefficiencies for services.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of a system environment for implementing a policy enforcement service.

FIG. 5 illustrates an exemplary user interface for creating a resource, in accordance with an embodiment.

FIG. 6 illustrates an exemplary user interface for selecting a blueprint for creating a resource, in accordance with an embodiment.

FIG. 7 illustrates an exemplary user interface for configuring a resource using a selected blueprint.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
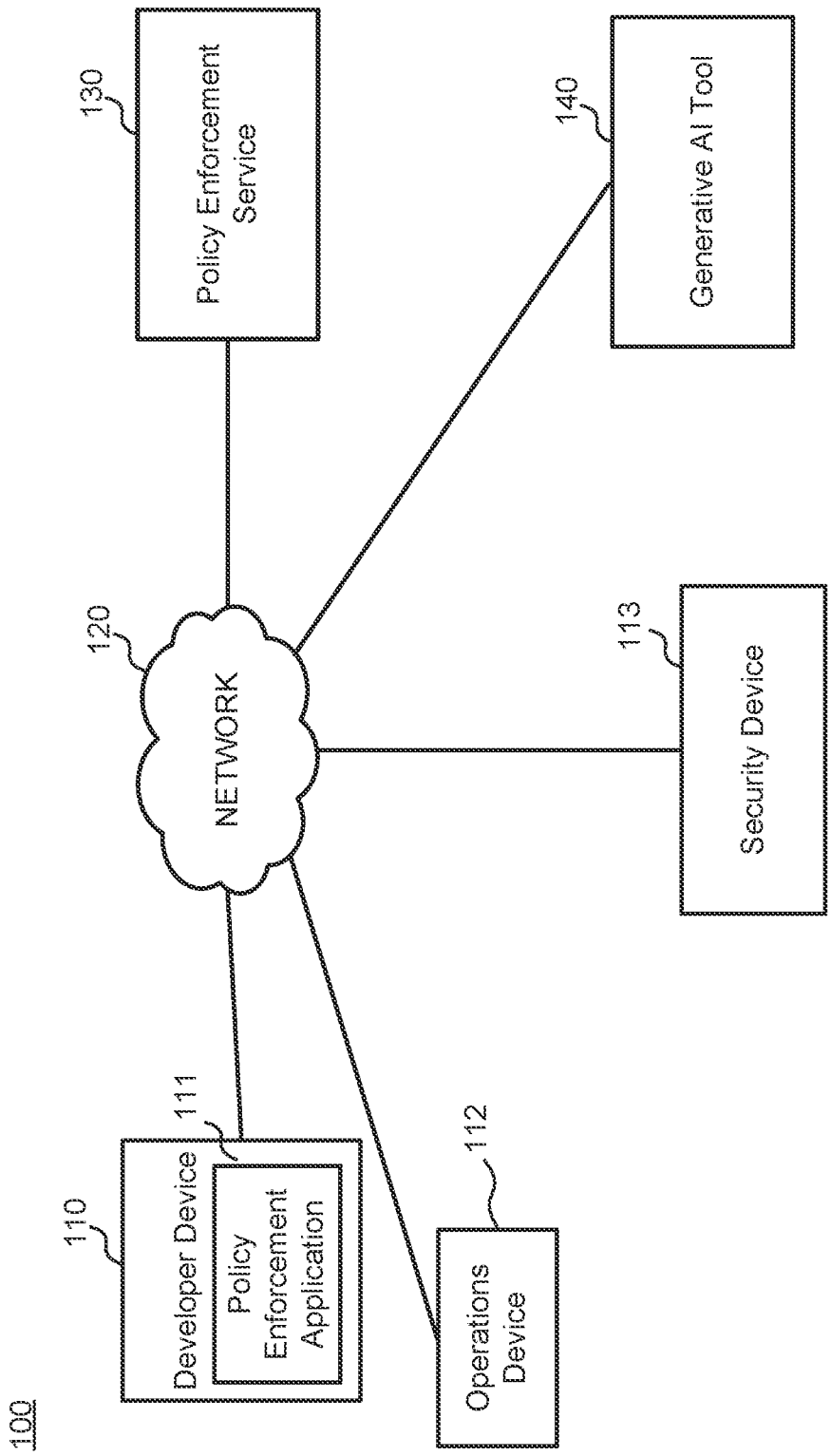

Figure (FIG. 1 illustrates one embodiment of a system environment for implementing a policy enforcement service. As depicted in FIG. 1, policy enforcement service environment 100 includes various client devices, including a developer device 110, operations device 112, and security device 113, as well as network 120, policy enforcement service 130, and generative artificial intelligence (AI) tool 140. While policy enforcement application 111 is only depicted with respect to developer device 110, this is for convenience only, and may exist on any client device. Developer device 110 is operated by a developer of a resource. The term developer, as used herein, may refer to anyone who creates a resource, such as a developer, a person who launches cloud resources, or any user of a client device who creates resources. Operations device 112 is operated by a person dedicated to operations, such as compliance management, in association with a same service as the developer. Security device 113 is operated by a person dedicated to security compliance, and may be a third party relative to the service or may be part of the service. A service, as used herein, is a collection of one or more cloud resources that together, perhaps in coordination with other activities, form a client-facing tool.

Policy enforcement service 130 is used by client devices (e.g., operations device 112 and/or security device 113) to generate guardrails. The term guardrail, as used herein, may refer to properties of resources that are to be adhered to by developers. The guardrails may be specific to types of resources—that is, databases having sensitive information is one type of resource, and databases accessible to certain geographies is another type of resource. The guardrails are defined by client devices having permissions to define constraints for given types of resources.

Guardrails may be established for resources of any kind, including newly created resources and existing resources that are imported. While newly created resources can be created in any manner (e.g., coded from scratch), blueprints may be used to create resources as well. For example, a library of blueprints may be available for quick resource creation, where a user can access the library and select a blueprint to create a resource. Guardrails may be established for new blueprints that are used to create resources, such that the blueprints, when used to create a resource, result in the resource adhering to the guardrails. Where blueprints are imported, guardrails may be imposed on those blueprints that, where blueprints are non-compliant, cause the blueprints to be modified in order to be usable following importation. Blueprints are described in further detail below.

After the guardrails are established, when developer device 110 generates a resource, policy enforcement application 111 forces the resource to have properties that adhere to the defined constraints. Policy enforcement service 130 is instantiated on one or more servers outside of the service of developer device 110, accessible by way of network 120. Policy enforcement application 111 is an application installed on developer device 110 and/or accessible by way of a browser of developer device 110. Some or all functionality of policy enforcement service 130 described herein may be distributed or fully performed by policy enforcement application 111 on a client device, or vice versa. Where reference is made herein to activity performed by policy enforcement application 111, it equally applies that policy enforcement service 130 may perform that activity off of the client device, and vice versa. Further details about the operation of policy enforcement service 130 are described below with reference to FIG. 2.

Figure 2:
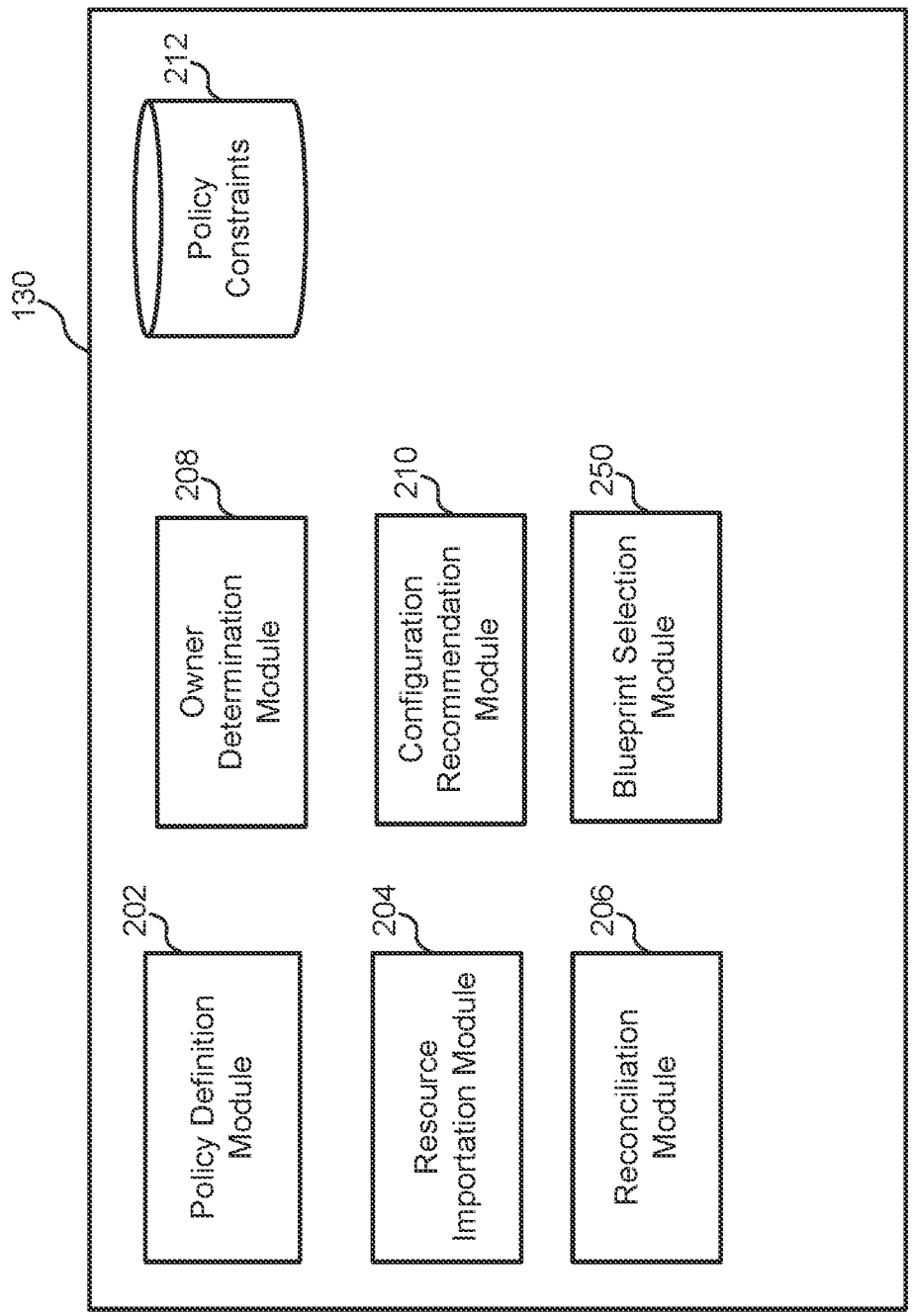
FIG. 2 illustrates one embodiment of modules of the policy enforcement service.

FIG. 2 illustrates one embodiment of modules of the policy enforcement service. As depicted in FIG. 2, policy enforcement service 130 includes policy definition module 202, resource importation module 204, reconciliation module 206, owner determination module 208, configuration recommendation module 210, policy constraints database 212, and blueprint selection module 250. These modules and databases are merely illustrative; fewer or more modules and/or databases may be used to achieve the functionality disclosed herein.

Policy definition module 202 defines policies that apply to newly created resources, as well as apply to existing, imported resources in bringing those imported resources into compliance. The term policy, as used herein, may refer to a collection of guardrails that are applied to a resource or a collection of resources. A policy may be created on a per-resource basis, on a resource attributes basis (e.g., where a resource has one or more certain attributes, a policy applies), or any other basis. A resource may be subject to compliance with multiple policies.

Figure 4:
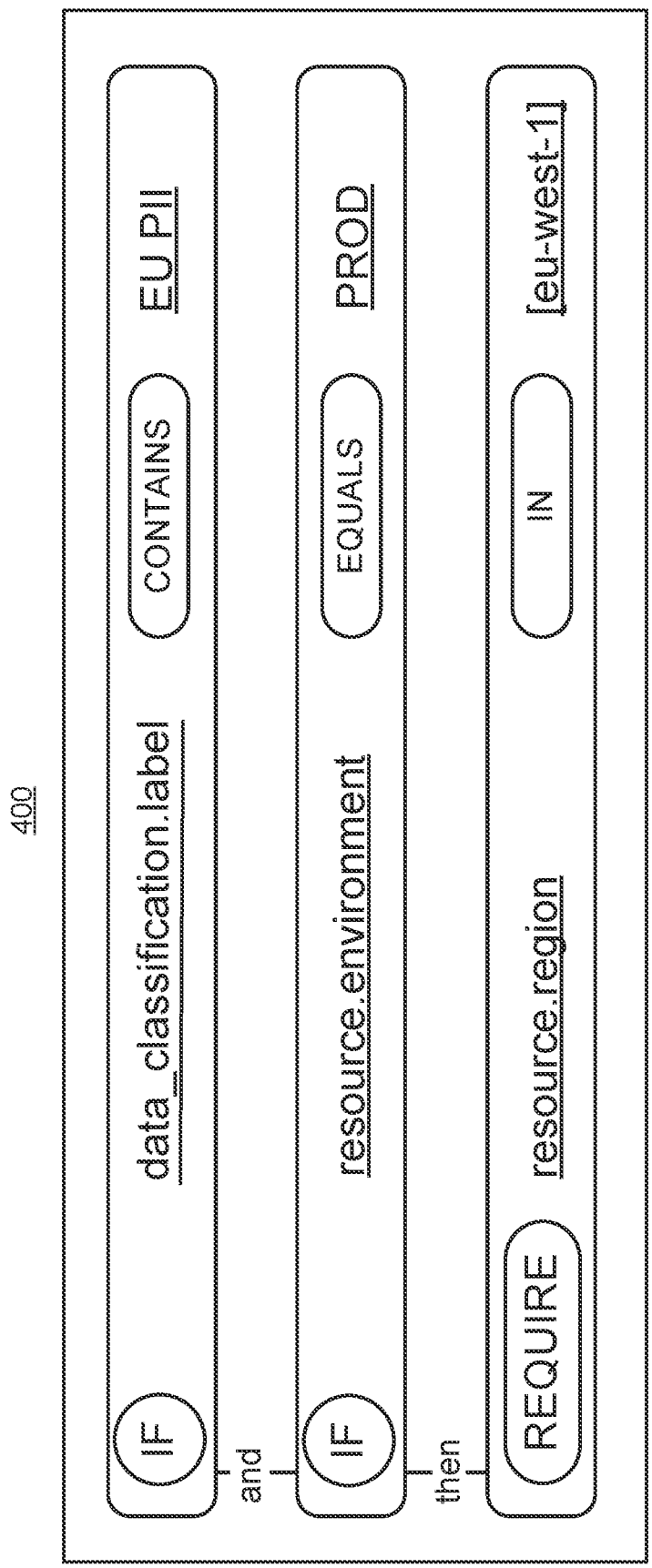
FIG. 4 illustrates an exemplary user interface for defining a resource policy, in accordance with an embodiment.

A policy may be defined by any client device, but generally is defined by an operations device 112 and/or a security device 113. In an embodiment, policy definition module 202 receives code lines from a client device that define a policy. In another embodiment, policy definition module 202 receives input of functional blocks from a client device (e.g., by way of a user interface of policy enforcement application 111) that define a policy. For example, turning to FIG. 4, user interface 400 includes a defined policy, where if a data classification label contains personal identifying information relating to Europe, and if a resource environment relates to a product, then the resource must be created in a geographical location defined as Europe West 1. In an embodiment, policy definition module 202 detects a selection of each segment of the policy (e.g., each "if" or "require" bar, by way of clicking, touching, drag-and-drop, or any other method of selection) by way of user input into a graphical user interface of a client device. Following implementation of this policy, newly created resources having these attributes will be forced to be created in Europe West 1 (e.g., by only offering Europe West 1 as an option for location). An imported resource that has these attributes but is located in a different location (e.g., Europe East 2) would be forced to migrate to Europe West 1.

Policy definition module 202 may display candidate segments in a menu, list, or other navigable tool for selection, where users may select from functional blocks including conditions (e.g., "if" statements), as well as requirements (e.g., what to do where conditions are met). This enables users who are not fluent in drafting computer code to nonetheless develop policies that developers are to adhere to. In an embodiment, policy definition module 202 outputs recommendations of one or more individual candidate segments and/or recommendations of candidate collections of segments that together can form a policy. Policy definition module 202 may train a machine learning model using training examples to generate recommendations. The training examples may be specific to a user based on prior policies created by the user, or may be specific to a group of users (e.g., training examples across a team, department, or conglomerate may be used). The training examples may include collections of segments as labeled by a resource and/or resource type and/or resource attribute.

Policy definition module 202 may input data into a machine learning model as a user supplies information. The supplied information may be a selection of one or more segments and/or other information about the resource to which the policy will apply. Policy definition module 202 may receive as output from the machine learning model probabilities that different candidate segments would be selected and/or different collections of candidate segments that may apply. Policy definition module 202 may output on the user interface a ranked list of candidate segments, the rankings being based on the probabilities. The ranked list may be truncated to at most include a predefined amount of segments, and/or may be truncated to include candidate segments that have at least a threshold probability of being selected. Policy definition module may receive a selection from the user, and may re-train the machine learning model using that feedback. This may result in a different ordering of candidate segments in the future. For example, where the same input is provided by the user in the future, a different ordering of candidate segments may be shown to the user in the ranked list based on the prior application usage by the user. Where all recommendations are ignored and the user selects different candidate segments that were not part of the recommendation, the machine learning model may be retrained to reflect negative bias toward each candidate segment with respect to the inputs provided by the user.

As policies are defined, policy definition module 202 populates policy constraints database 212 with the policies. From here, as developer device 110 creates resources and defines attributes of those resources, policy constraints database 212 is queried for guardrails relating to those attributes. As an example, turning briefly to FIG. 5, user interface 500 shows a user creating a resource (e.g., a bucket or data store) that will hold PII of a European Union citizen. The guardrail from the policy established in FIG. 3 exists, and so responsively, policy enforcement service 130 references policy constraints database 212 and determines that the EU-west-1 region should be offered based on the policy. Additionally, policy enforcement service offers an "other" option as a guardrail, where any other region for deployment requires approval (e.g., by an entity defined in the policy, or by a default approver such as a user of an operations device 112 or security device 113).

Returning to FIG. 2, resource importation module 204 imports existing resources into an environment of policy enforcement service 130. For example, a service may have existed outside of environment 100 and may elect to join environment 100. In such a case, newly created resources would conform to policies for that service, but older, existing policies may need to be reconciled in order to conform to those policies. Reconciliation module 206 detects the importation of a new resource, and determines whether a configuration of that resource is not in compliance with policy constraints 212 that relate to that resource. To this end, reconciliation module 206 determines a type of the pre-existing resource, and queries policy constraints 212 to determine policies that apply to a resource of that type (e.g., a data store or bucket as in the example of FIG. 4). The term type, as used herein, may refer to a category of resource. The category of resource may reflect one or more attributes of the resource. A resource may have more than one type. As an example, a resource for hosting personally identifying data may be of the type "storage" and also of the type "sensitive." A data structure that maps attributes to types may be referenced to determine a type of a resource. Responsive to determining that the pre-existing resource is of the given type, reconciliation module 206 determines whether the pre-existing resource does not comply with the policy constraints, and if so, begins a reconciliation process. To determine whether a pre-existing resource complies with policy constraints, reconciliation module 206 may compare attributes of the pre-existing resource to guardrails of a policy. Compliance does not occur where a guardrail would have been broken had the pre-existing resource been created to conform to the policy, rather than having been created elsewhere and then imported.

A reconciliation process may begin with reconciliation module 206 determining an owner of a resource. The term owner, as used herein, may refer to an individual person, a group of individuals, or a person having a certain credential (e.g., a vice president or higher level employee in a certain division is defined to be an owner). In some embodiments, a resource may have edit protections where only an owner of the resource can edit the resource. Metadata of the resource may indicate the requirements of who qualifies as an owner. However, in some cases, the owner may not be defined by the resource. To this end, owner determination module 208 may use metadata of the resource to determine a log source of the resource (e.g., an event log relating to creation or maintenance of the resource, such as a Cloud-Trail log or a Git history for resources that were checked in to infrastructure-as-code repositories). Ownership determination module 208 may identify a user identifier within a log of the log source (e.g., a handle or contact address of a candidate owner), and may determine that the owner is the person identified by the user identifier. In an embodiment, owner determination module may prompt the owner to confirm that that user is indeed the owner. In another embodiment, owner determination module 208 may simply conclude that this person is the owner.

In an embodiment, ownership determination module 208 accesses a machine learning model trained to identify an owner of the file. Ownership determination module 208 may input code lines of the file and/or metadata of the file into the machine learning model. The machine learning model may output a prediction of who the owner of the file is. The output may be a direct prediction, or may assign probabilities to each user identifier named within the resource as to whether that user identifier is or is not an owner. Where probabilities are assigned, ownership determination module 208 may determine that a user identifier corresponds to an owner responsive to determining that the probability output by the machine learning model exceeds a threshold value.

The machine learning model may be trained by generating embeddings for different segments of code and metadata within a resource. For example, lines of code and metadata that include a user identifier may be converted into a semantic representation in latent space using a supervised machine learning model. Owner determination module 208 may then use an unsupervised machine learning model to determine the distance in latent space between one or more example owner embedding representations and each semantic representation. Where a distance is below a threshold, owner determination module 208 may determine that the user identifier within the corresponding text to the latent representation is the owner.

After the owner is determined, configuration recommendation module 210 prompts the owner with a set of recommended configuration changes, which may be determined based on a comparison of configuration settings of the pre-existing resource to the policy constraints. For example, if a resource includes PII and European Union citizen data but is stored somewhere other than the EU-west-1 region, then the recommended configuration changes may include relocating the resource to the EU-west-1 region. As another example, a policy constraint may indicate that a resource should only interact with a predefined number (e.g., 1) of applications, and reconciliation module 206 may determine that the resource interacts with 4 applications. Configuration recommendation module 210 may prompt the owner to remove access to 3 of those applications in this example. Moreover, configuration recommendation module 210 may recommend for which application(s) to maintain access (e.g., based on ranking the applications on some metric, such as access frequency).

Configuration recommendation module 210 may recommend changes using a machine learning model. Configuration recommendation module 210 may input into the machine learning model the policy constraints and attributes of the resource (or a portion thereof, such as attributes not in compliance with the constraints), and may receive as output from the machine learning model a recommendation of what to change in the attributes of the resource to comply with the constraints. The machine learning model may be trained using historical data, where each training example in the historical data includes resource attributes and constraints as labeled with changes to the resource attributes that were taken. Configuration recommendation module 210 may output for display the recommendation of what to change to the owner.

These recommendations may be selectable and, responsive to receiving a selection of a selectable option from the owner, configuration recommendation module 210 may reconfigure the resource with the recommended configuration changes. In some embodiments, responsive to receiving a selection of a selectable option from the owner, configuration recommendation module 210 may retrain the machine learning model that is used to output a recommendation to add a positive bias toward the selected option and/or a negative bias toward unselected options, thereby resulting in a change in recommendations in the future.

In an embodiment, configuration recommendation module 210 may open a pull resource to change an infrastructure-as-code configuration of the resource and prompt the owner to apply the change. In either case, reconfiguration and/or application may involve restructuring the resource itself. For example, where a data store is moving regions, configuration recommendation module 210 may generate a new resource in the region to which a resource is to be moved, command that data be copied from the old region to the new region (e.g., from EU-east-1 to EU-west-1), and then command that the old resource be torn down. Tear downs and migrations may occur in similar scenarios, such as where a policy requires migration to a server having more security from a server having insufficient security. In such cases, configuration recommendation module 210 may perform the requisite restructuring conforming to the selection of the owner, including teardowns and migrations.

Blueprint selection module 250 drives a user experience (UX) to guide a user in creating a resource. The term blueprint, as used herein, may refer to a framework for creating a resource. The framework may include pre-configured parameters, such as policy constraints that must be adhered to when creating the resource. Policy constraints (e.g., guardrails) may be part of policies generated in any manner described above with respect to FIGS. 2-5, and may automatically be applied to a blueprint based on a type of resource that can be generated by the blueprint. For example, where a blueprint is for creating a resource that stores personal identifying information and European Union citizen data, the blueprint may only offer to set up the resource in Europe West 1, consistent with the above examples used with respect to FIGS. 2-5.

The framework may also include a set of fields where input is required that together form the information needed to create the resource. Policies and policy constraints for a given blueprint may be defined in any given manner described above (e.g., with respect to policy definition module 202), where, rather than expressly defining a policy for a single resource, the policy is instead defined for any resource created using a given blueprint. Blueprints may be newly created, or may be imported. Where blueprints are imported, all activities described with respect to resources in connection with resource importation module 204, reconciliation module 206, owner determination module 208, and configuration recommendation module 210 equally apply. That is, when a blueprint is imported, the imported blueprint may be checked to ensure that resources created using that blueprint comply with existing policy constraints for that type of resource.

Turning briefly to FIG. 6 for illustrative purposes, FIG. 6 illustrates an exemplary user interface for selecting a blueprint for creating a resource, in accordance with an embodiment. As shown in FIG. 6, a plurality of (in this case, three) different blueprint options are available from user interface 600—a web services bucket (named AWS bucket) for private and intranet data storage, a cloud object store (named GCP storage) for highly sensitive data, and a web services bucket (named AWS Bucket as well) for public data. Different guardrails may apply for the different types of data storage based on their associated policies. User interface 600 may include any number of blueprints for selection. In an embodiment, all blueprints may be presented in user interface 600. In an embodiment, the blueprints shown in user interface 600 may be results from a search (e.g., in this example, where a user is searching for a blueprint for creating a storage resource). As described below, the blueprint options may be ranked and ordered based on a recommendation engine driven by blueprint selection module 250, and application usage by users in selecting and using blueprints to create resources may change how the blueprint options are ranked and ordered over time, thus resulting in an improved user interface. Blueprint options are selectable options that, when selected from user interface 600, result in configuration prompts for the user as shown in FIG. 7.

Turning next to FIG. 7 for further illustration, FIG. 7 illustrates an exemplary user interface for configuring a resource using a selected blueprint. As depicted in user interface 700, after a blueprint is selected, configuration prompts are generated for display to the user. At least some of the configuration fields are custom built for the selected blueprint. For example, a user might be required by the blueprint to indicate what team manages data within the resource, but other blueprints may not require this data. The blueprint may have preconfigured policy constraints—for example, out of five possible environments for the resource, the policy constraint may only make two of those possible environments available where this blueprint is used. These policy constraints may be associated with their corresponding blueprints using a data structure within policy constraints database 212. User interfaces 600 and 700 may be part of policy enforcement application 111 and may be driven as part of processes of resource configuration module 810, described further below with reference to FIG. 8.

Figure 8:
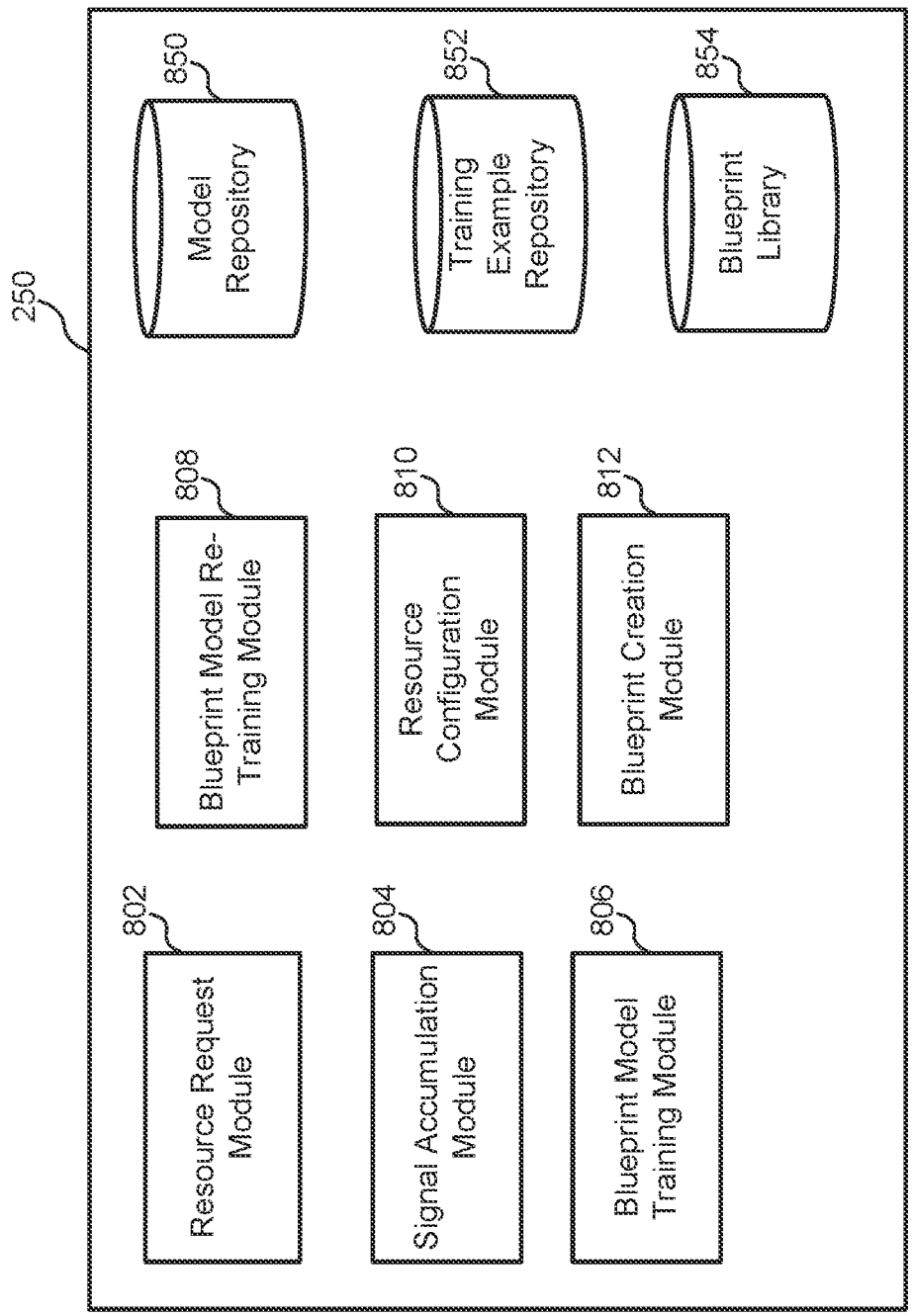
FIG. 8 illustrates one embodiment of sub-modules of a blueprint selection module.

FIG. 8 illustrates one embodiment of modules of the blueprint selection module. A description of modules of the blueprint selection module 250 that act to perform functionality that enables the UX described above with respect to FIGS. 6-7 follows. As depicted in FIG. 8, blueprint selection module 250 includes resource request module 802, signal accumulation module 804, blueprint model training module 806, blueprint model re-training module 808, resource configuration module 810, and blueprint creation module 812. Blueprint selection module 250 also has access to model repository 850, training example repository 852, and blueprint library 854. These modules and databases are merely illustrative; fewer or more modules and/or databases may be used to achieve the functionality disclosed herein.

Resource request module 802 may receive, based on input by a user, a request to generate a resource. Resource request module 802 may receive the request based on a selection of an icon of policy enforcement application 111 that corresponds with resource creation, or an express selection of an icon to access candidate blueprints, or through any other command aimed at achieving generation of a new resource. The request may include one or more search parameters that cause a results list of matching blueprints to be displayed in the UX.

In an embodiment, resource request module 802 causes display within the UX of a field that accepts one or more search parameters. The search parameters may include descriptors of relevant resources, such as any combination of resource title, resource type, resource attribute(s), resource requirements (e.g., must be deployable in EU East 1), and/or any other parameter useful in locating candidate blueprints (e.g., recency parameters, size parameters, and so on). In response to receiving the request, resource request module 802 may search for blueprints matching the parameters within blueprint library 854. Blueprint library 854 may be a repository of blueprints, which may be indexed according to any number of searchable parameters.

Prior to causing a display of the user interface having the plurality of blueprints for selection, in some embodiments, blueprint selection module 250 determines which blueprint icons to display, and in what order to display them. To this end, blueprint selection module 250 may input signals (accumulated by signal accumulation module 804) into a machine learning model (stored in model repository 850), and may receive output of blueprints corresponding to the signals, from which blueprint selection module 250 may determine which blueprint icons to display. The supervised machine learning model may be, for example, a deep neural network, a convolutional neural network, or any other supervised machine learning model, as stored in model repository 850.

The machine learning model may be trained by blueprint model training module 806 using training examples stored in training example repository 852. For example, each blueprint may have a plurality of attributes (e.g., what the resource that it will generate is, how the resource it will generate is configured, policies for the resource to be generated, policy constraints for the resource to be generated, and so on). The supervised machine learning model may be trained using training examples having sets of signals that are labeled. The signals may correspond to one or more of a profile of an entity that selects the blueprint. The entity may include one or more of a individual, a team on which the individual is place, a domain associated with the individual, a classification of the domain, and so on. For example, data from a profile of a user that selects the blueprint may form part of the training data, including information about the user and information about activities of the user (e.g., blueprint options that the user did or did not select and context information surrounding each of those selections, such as information about other resources created by the user within a time interval of making that selection). Profile data may include any other information known about a user or other entity, such as characteristics of the user/users within an entity, and so on.

Similarly, data from profiles of teams (e.g., profiles of multiple users that form a team) may be taken in the aggregate as signals. Data of domain (e.g., a domain in which the team operates where there are multiple teams within that domain) may be taken from profiles of the users within that domain in similar fashion, and so on. A classification of the domain may be used as a signal (e.g., a resource is being created for a domain in the information technology space versus the administrative space, information technology and administrative being example classifications). The signals may also include search parameters received using resource request module 802.

Regardless of the set of signals for each training example, the training example may be labeled. The labels may indicate whether a blueprint having a given set of attributes (e.g., attributes of the blueprint that may form part of the training data) presented to an entity having their own given profile attributes was selected by the entity, and may also indicate context data, such as other blueprints that were and were not selected by the entity for creating a given resource. For example, it is informative not just whether a given blueprint is selected, but which blueprints were not selected in a given scenario, as the model can then be trained to predict, given a set of candidate blueprints having respective attributes, a likelihood that a given user would select a given one of the set of candidate blueprints. The training examples may be stored in training example repository 852.

Blueprint model training module 806 may train one or more machine learning models using the training examples stored in training example repository 852, yielding models stored in model repository 850. In order to train one or more models, blueprint model training module 806 may retrieve training examples that conform to a policy (e.g., train a model for a specific user, for a specific team, for a specific domain, for an entire entity, and so on), and may train a model using the conforming training examples. Models may be trained on-the-fly as a given user requests creation of a resource according to a policy dictating how to train the model for that user. In some embodiments, models may be trained in advance and may be retrieved from model repository 850 for usage responsive to resource creation requests being received, the model being retrieved according to who the user is and a policy dictating which model is to be used.

Machine learning models may be generic and operate across different teams within a given domain. Alternatively or additionally, given domains and/or teams and/or users may each have their own machine learning models that are trained specifically for that domain. For example, where training data is sensitive and activity of a domain is to remain secure, training data may not be permissible to be used to train a model to be used outside of that domain, and thus a domain-specific model may be used.

Following training one or more models, each model is equipped to take as input a set of signals and, given a set of candidate blueprints, rank and order the candidate blueprints in terms of likelihood that a given user would select each given candidate blueprint. This may be performed with signal accumulation module 804 determining a set of signals to input into a supervised machine learning model. To this end, the signals may include any combination of data about a user, a team on which the user operates, a domain of the user, a classification of the domain of the user, and so on. As a proxy for this data, the signals may include an aggregate set of signals for users like the given user. Moreover, the signals may include contextual information, such as other resources recently created by the user (e.g., because the model may be able to predict that where a given resource is created, a next resource is likely to be created). The signals may include profile data of the user (or users within a team, domain, and so on). The signals may include search parameters input by the user and other parameters derived from those search parameters (e.g., synonyms). Based on the set of signals, the machine learning model may output a probability for each given blueprint of the plurality of blueprints that the user will access the given blueprint. The blueprints evaluated may be blueprints that are available to the user for use by a domain of the user, and may be further limited by search terms of the user for blueprints that pertain to resource creation that satisfies certain specified criteria.

Blueprint selection module 250 may assign ranks to each given blueprint of the plurality of blueprints based on their corresponding probabilities, and may order the plurality of blueprints based on the ranks. Using the order, blueprint selection module 250 may generate for display user interface (e.g., user interface 600), each blueprint comprising a selectable option that, when selected, leads to fields for configuring the resource. That is, blueprint options in user interface 600 may be ordered based on a likelihood that the user will use each given blueprint for creation of the resource.

In an embodiment, responsive to a blueprint being selected, blueprint model re-training module 808 may cause the supervised machine learning model to be re-trained. Such retraining may be based on which blueprint of the plurality of blueprints is selected. For example, where a highest-ranking blueprint is selected, biases that led to the highest-ranking blueprint to be ranked first may be strengthened. Where a lower ranking blueprint is selected, its biases may be improved, and other biases for the other candidate blueprints may be weakened. This may result in a scenario where assigning ranks and ordering a future a set of blueprints in a future request to generate a resource is altered based on the supervised machine learning model being re-trained. This results in an improved user interface that updates blueprint icon ordering for a recommendation to a user based on application usage.

In an embodiment, blueprint selection module 250 may use generative artificial intelligence (AI) based on a large language model to recommend one or more blueprints from blueprint library 854. Generative AI poses challenges in computational time and expense, in that when it is prompted with a query, the models used explore a huge universe that requires immense processing power. In an embodiment, blueprint model training module 806 may prime a generative AI model with a limited context window to improve the computational efficiency by one or more orders of magnitude. Specifically, blueprint library 854 may be associated with a metadata catalog. The metadata catalog may include natural language that describes features of a blueprint, such as a title, a description, options available for configuring the resource, properties, and any other attributes.

As an example, a blueprint may be associated with building a "Back-up Bucket". The metadata catalog may include "Description: Bucket for backing up files, versioning is on and files will be rotated to Nearline/Coldline/Glacier after a configurable number of days." The metadata catalog may also include: "Options: (1) Bucket name; (2) Location (if applicable); (3) Number of days before moving to Nearline storage (if applicable); (4) number of days before moving to Coldline storage (if applicable); (5) Age of an object before transitioning to Glacier (if applicable)." For properties, the metadata catalog may include "Properties: (1) Force destroy enabled; (2) Uniform bucket level access; (3) Public access block; (4) Incomplete multi-part uploads are aborted after 7 days." Blueprint library 854 may have similar associated catalog entries for any or all blueprints within the library.

Blueprint model training module 806 may prime a generative AI model by feeding it the metadata catalog for searchable context. This enables a user to enter a natural language query (e.g., using resource request module 802), where the query is fed as input into the generative AI model, and where a search space performed by the generative AI model is informed by the context of the catalog, reducing search spaces in other areas and thereby reducing computational power required and time required to process the query. As an example, resource request module 802 may receive a query of "Recommend a blueprint for an S3 bucket." The generative AI model may search using the context of the catalog, and may provide one or more candidate blueprints (in this case, one or more candidate blueprints for building a bucket). Where more than one candidate blueprint is surfaced, they may be ordered based on use of signals accumulated by signal accumulation model 804 as described in the foregoing, which may result in an ordering of candidate blueprints being made on the user interface using ranking as described above.

Resource configuration module 810 may be used to configure a resource in any manner discussed in the foregoing with respect to FIGS. 2-7. Returning to FIG. 7, in some embodiments, the same or a different supervised machine learning model may be used to suggest input into fields of user interface 700. For example, the machine learning model may ingest some or all of the set of signals, and may determine likely inputs into any given field of user interface 700 for creating a resource using a selected blueprint from the recommended candidate blueprints. The machine learning model may output one or more suggestions (e.g., by pre-filling a given field with a tab-to-complete suggestion) for what to input into that field. For example, where a typical user having a profile of the user filling out user interface 700 typically inputs a certain string into a team field, the machine learning model may output a prediction that this string will be input there, and such a string may be suggested for input. Blueprint model re-training module 808 may re-train the model used to output the suggestion in a manner similar to re-training to output recommended blueprints based on whether each suggestion in accepted or declined.

In an embodiment, to enable seamless blueprint creation, guardrails may be used as building blocks for blueprint creation and may apply one-to-many with blueprints. Blueprint creation module 812 may enable users to create blueprints from scratch. In an embodiment, blueprint creation module 812 receives express input of guardrails for each blueprint. In another embodiment, guardrails may be defined to automatically apply to blueprints having certain attributes. For example, a guardrail may define that "all buckets having Property 1 must be deployed in Region 1". Thereafter, as blueprint creation module 812 receives input that a blueprint is being created for buckets having Property 1, blueprint creation module 812 determines that Region 1 for deployment based on the guardrail, and automatically assigns Region 1 for that blueprint. Blueprint creation module 812 may generate detection logic where as blueprints are created, conditions are monitored that are indicated in the detection logic. Responsive to detecting one of those conditions, blueprint creation module 812 applies the corresponding rule from the guardrail in which the condition is established.

Blueprints may be generated in a manner that makes them automatically modifiable as guardrails are updated. Blueprint creation module 812 may receive a command to implement one or more guardrails for a blueprint, where the guardrails define one or more tags. Tags may be mapped to a data structure that defines the guardrails, where the data structure is modifiable by one or more users. Following creation of a blueprint, where the data structure corresponding to tag is modified, that modification applies to the blueprints featuring the tag, thus causing the blueprints to include that update as new resources are created using that blueprint. Moreover, existing resources generated using blueprints may feature those tags as well, thus enabling automatic updating of those existing resources in the same manner. As an example, a guardrail may specify that Security Feature 1 must apply to buckets having Property 1. When Security Feature 1 is overwritten in the data structure corresponding to these buckets by Security Feature 2, all buckets having Property 1 automatically update to using Security Feature 2, and all blueprints for creating such buckets are automatically updated to feature a guardrail for Security Feature 2 as well.

Figure 9:
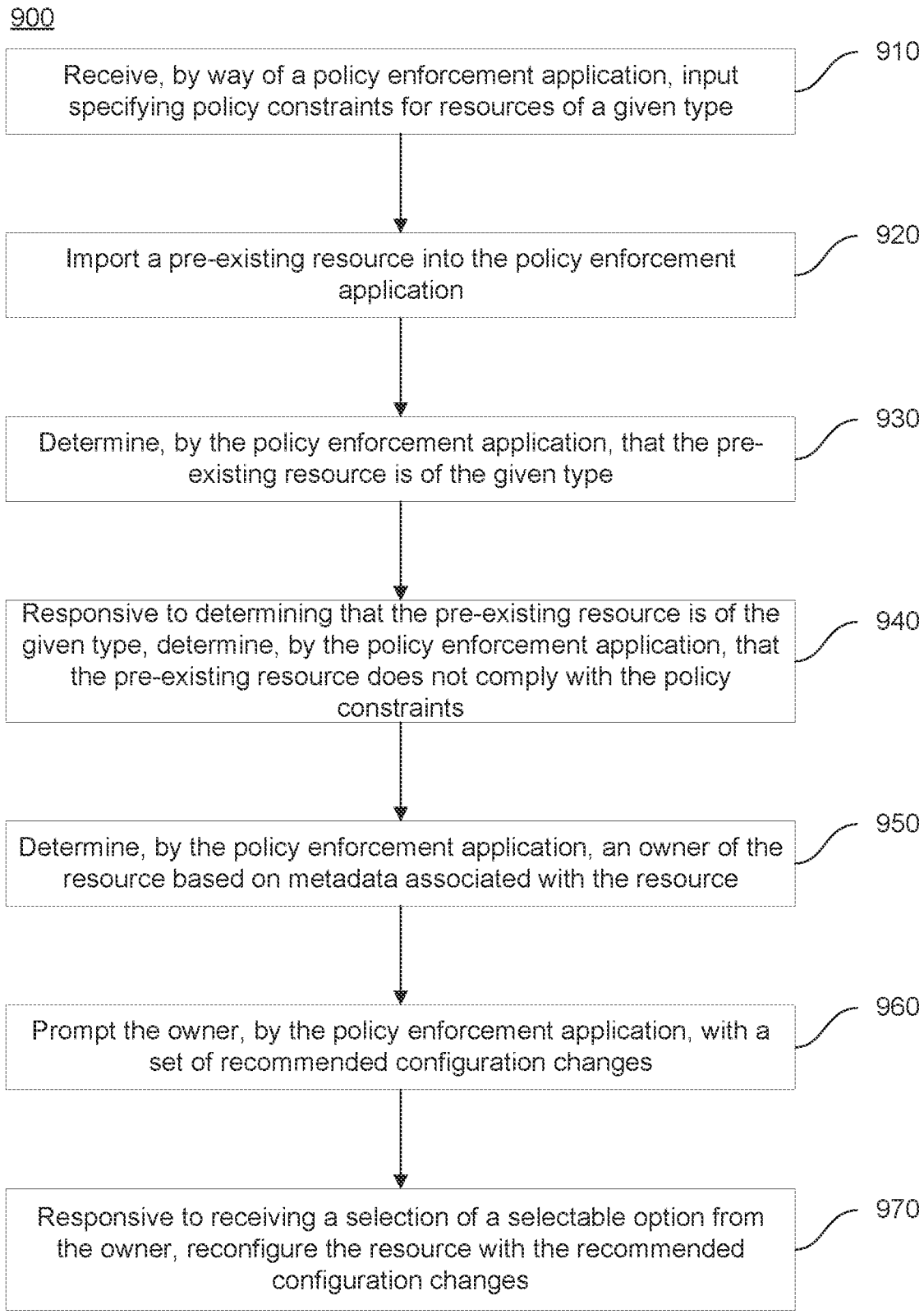
FIG. 9 illustrates a flowchart showing an exemplary process for identifying an owner of a resource, in accordance with an embodiment.

FIG. 9 illustrates a flowchart showing an exemplary process for identifying an owner of a resource, in accordance with an embodiment. Process 900 may be executed by one or more processors (e.g., processor 302 of policy enforcement service 130) executing instructions (e.g., instructions 324). Process 900 may begin with policy enforcement service 130 receiving 910, by way of a policy enforcement application (e.g., policy enforcement application 111), input specifying policy constraints for resources of a given type (e.g., as performed using policy definition module 202). Policy enforcement service 130 may import 920 a pre-existing resource into the policy enforcement application (e.g., using resource importation module 204).

Policy enforcement service 130 may determine 930 that the pre-existing resource is of the given type (e.g., using reconciliation module 206) and, responsive to determining that the pre-existing resource is of the given type, may determine 940 that the pre-existing resource does not comply with the policy constraints. Policy enforcement service 130 may determine 950 an owner of the resource based on metadata associated with the resource (e.g., using owner determination module 208), and may prompt 960 the owner with a set of recommended configuration changes (e.g., using configuration recommendation module 210). Responsive to receiving a selection of a selectable option from the owner, policy enforcement service 130 may reconfigure 970 the resource with the recommended configuration changes.

Figure 10:
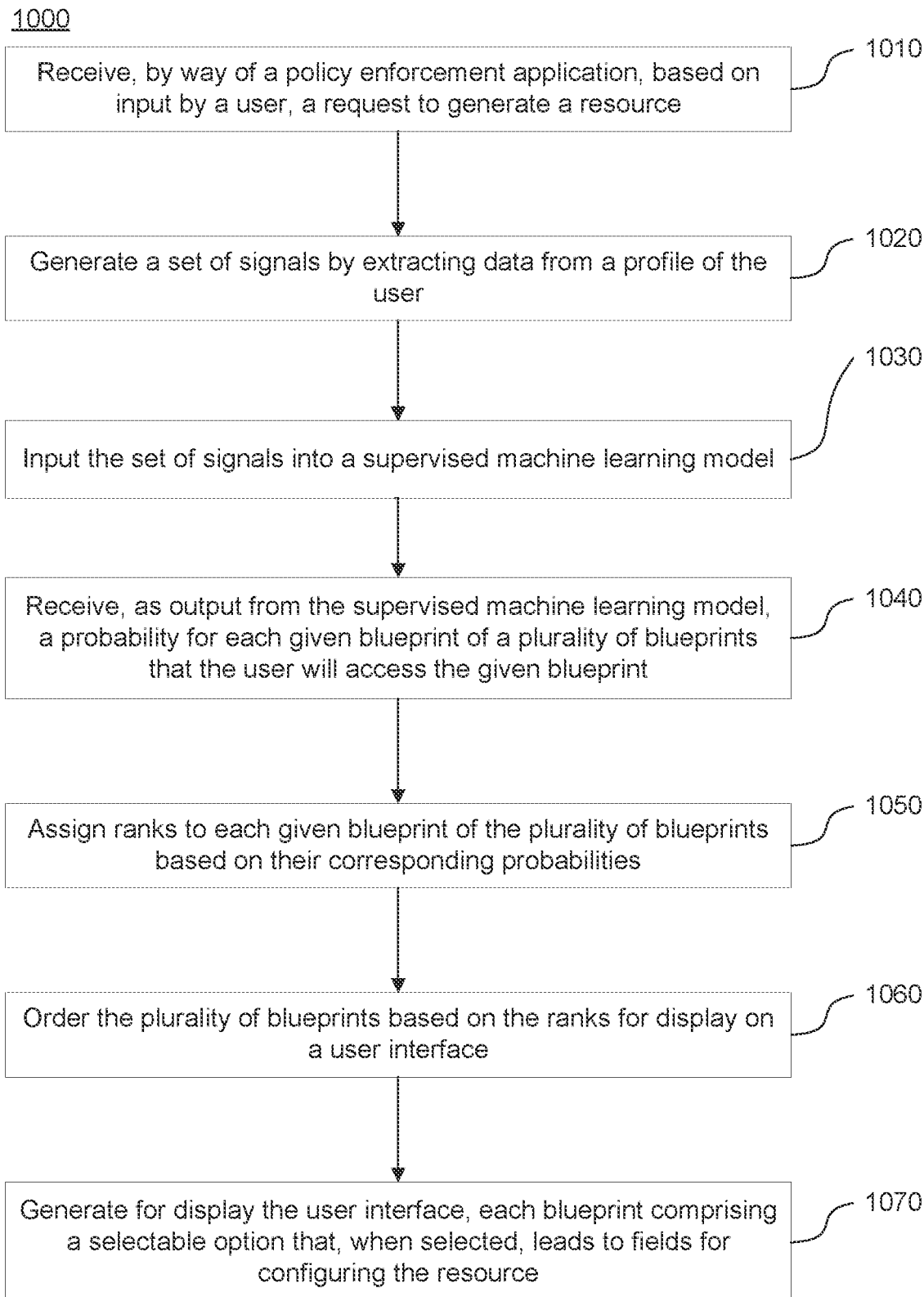
FIG. 10 illustrates a flowchart showing an exemplary process for recommending blueprints for resource creation, in accordance with an embodiment.

FIG. 10 illustrates a flowchart showing an exemplary process for recommending blueprints for resource creation, in accordance with an embodiment. Process 1000 may be executed by one or more processors (e.g., processor 302 of policy enforcement service 130) executing instructions (e.g., instructions 324). Process 1000 may begin with policy enforcement service 130 receiving 1010, based on input by a user, a request to generate a resource (e.g., using resource request module 802). Policy enforcement application 130, in response to receiving the request, generate a user interface (e.g., user interface 600) comprising a plurality of blueprints (e.g., of blueprint library 854) for creating the resource.

The user interface may be generated by generating 1020 a set of signals by extracting data from a profile of the user (e.g., using signal accumulation module 804), inputting the set of signals into a supervised machine learning model (e.g., stored in model repository 850, and trained using blueprint model training module 806 based on training examples of training example repository 852), and receiving 1040, as output from the supervised machine learning model, a probability for each given blueprint of the plurality of blueprints that the user will access the given blueprint. Policy enforcement service 130 may assign 1050 ranks to each given blueprint of the plurality of blueprints based on their corresponding probabilities, and may order 1060 the plurality of blueprints based on the ranks. Policy enforcement service 130 may generate for display the user interface, each blueprint comprising a selectable option that, when selected, leads to fields for configuring the resource (e.g., using resource configuration module 810).

Computing Machine Architecture

Figure 3:
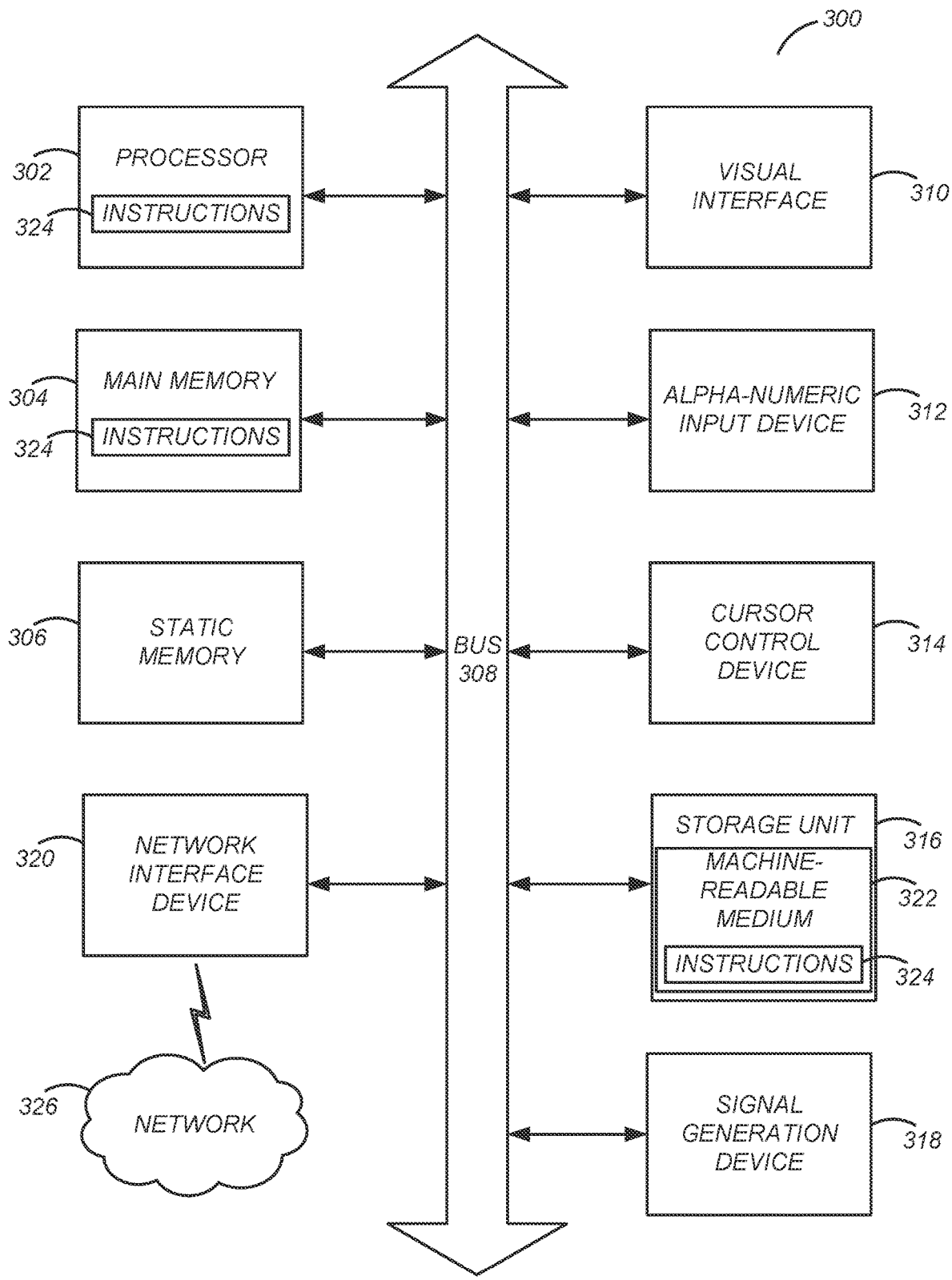
FIG. 3 is a block diagram illustrating components of an example machine able to read instructions from a machine-readable medium and execute them in a processor (or controller).

FIG. (FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alphanumeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for reconciling configuration settings for imported resources through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving, by way of a policy enforcement application, input specifying policy constraints for resources of a given type;
   importing a pre-existing resource into the policy enforcement application;
   determining, by the policy enforcement application, that the pre-existing resource is of the given type;
   responsive to determining that the pre-existing resource is of the given type, determining, by the policy enforcement application, that the pre-existing resource does not comply with the policy constraints;
   determining, by the policy enforcement application, an owner of the resource based on metadata associated with the resource;
   prompting the owner, by the policy enforcement application, with a set of recommended configuration changes; and
   responsive to receiving a selection of a selectable option from the owner, reconfiguring the resource with the recommended configuration changes.

2. The method of claim 1, wherein determining the owner of the resource comprises:
   determining a log source of the resource;
   identifying a user identifier within a log of the log source; and
   determining that the owner is a person identified by the user identifier.

3. The method of claim 2, wherein determining the owner of the resource further comprises:
   transmitting a query to an electronic device associated with the user identifier requesting confirmation of ownership; and
   determining the owner based on a response to the query.

4. The method of claim 1, further comprising determining the set of recommended configuration changes based on a comparison of configuration settings of the pre-existing resource to the policy constraints.

5. The method of claim 4, wherein the resource is a database, wherein the configuration settings indicate that the database is stored in a first location, wherein the policy constraints indicate that a database of the given type is to be stored in a second location, and wherein the reconfiguring the resource with the recommended configuration changes comprises:
   generating a copy of the database in the second location;
   migrating data of the database in the first location to the copy of the database in the second location; and
   tearing down the database in the first location.

6. The method of claim 4, wherein the resource comprises storage of sensitive information, wherein the configuration settings indicate that the resource accesses a number of applications, wherein the policy constraints indicate that a resource of the given type is to access no more than a predefined number of applications less than the number of applications, and wherein the method further comprises:
   determining, by the policy enforcement application, a ranking of each of the number of applications; and
   including, in the set of recommended configuration changes, a recommendation to disable access applications having a ranking lower than the predefined number.

7. The method of claim 6, wherein determining the ranking comprises:
   inputting signals corresponding to each application of the number of applications into a supervised machine learning model; and
   receiving, as output from the supervised machine learning model, a given ranking for each of the number of applications.

8. A non-transitory computer-readable medium comprising memory with instructions encoded thereon, the instructions, when executed, causing one or more processors to perform operations, the instructions comprising instructions to:

receive, by way of a policy enforcement application, input specifying policy constraints for resources of a given type;

import a pre-existing resource into the policy enforcement application;

determine, by the policy enforcement application, that the pre-existing resource is of the given type;

responsive to determining that the pre-existing resource is of the given type, determine, by the policy enforcement application, that the pre-existing resource does not comply with the policy constraints;

determine, by the policy enforcement application, an owner of the resource based on metadata associated with the resource;

prompt the owner, by the policy enforcement application, with a set of recommended configuration changes; and responsive to receiving a selection of a selectable option from the owner, reconfigure the resource with the recommended configuration changes.

9. The non-transitory computer-readable medium of claim 8, wherein the instructions to determine the owner of the resource comprise instructions to:

determine a log source of the resource;

identify a user identifier within a log of the log source; and determine that the owner is a person identified by the user identifier.

10. The non-transitory computer-readable medium of claim 9, wherein the instructions to determine the owner of the resource further comprise instructions to:

transmit a query to an electronic device associated with the user identifier requesting confirmation of ownership; and determine the owner based on a response to the query.

11. The non-transitory computer-readable medium of claim 8, wherein the instructions further comprise instructions to determine the set of recommended configuration changes based on a comparison of configuration settings of the pre-existing resource to the policy constraints.

12. The non-transitory computer-readable medium of claim 11, wherein the resource is a database, wherein the configuration settings indicate that the database is stored in a first location, wherein the policy constraints indicate that a database of the given type is to be stored in a second location, and wherein the instructions to reconfigure the resource with the recommended configuration changes comprise instructions to:

generate a copy of the database in the second location;

migrate data of the database in the first location to the copy of the database in the second location; and tear down the database in the first location.

13. The non-transitory computer-readable medium of claim 11, wherein the resource comprises storage of sensitive information, wherein the configuration settings indicate that the resource accesses a number of applications, wherein the policy constraints indicate that a resource of the given type is to access no more than a predefined number of applications less than the number of applications, and wherein the instructions further comprise instructions to:

determine, by the policy enforcement application, a ranking of each of the number of applications; and include, in the set of recommended configuration changes, a recommendation to disable access applications having a ranking lower than the predefined number.

14. A system comprising:

memory with instructions encoded thereon; and one or more processors that, when executing the instructions, cause the system to perform operations comprising:

receiving, by way of a policy enforcement application, input specifying policy constraints for resources of a given type;

importing a pre-existing resource into the policy enforcement application;

determining, by the policy enforcement application, that the pre-existing resource is of the given type;

responsive to determining that the pre-existing resource is of the given type, determining, by the policy enforcement application, that the pre-existing resource does not comply with the policy constraints;

determining, by the policy enforcement application, an owner of the resource based on metadata associated with the resource;

prompting the owner, by the policy enforcement application, with a set of recommended configuration changes; and responsive to receiving a selection of a selectable option from the owner, reconfiguring the resource with the recommended configuration changes.

15. The system of claim 14, wherein determining the owner of the resource comprises:

determining a log source of the resource;

identifying a user identifier within a log of the log source; and determining that the owner is a person identified by the user identifier.

16. The system of claim 15, wherein determining the owner of the resource further comprises:

transmitting a query to an electronic device associated with the user identifier requesting confirmation of ownership; and determining the owner based on a response to the query.

17. The system of claim 14, further comprising determining the set of recommended configuration changes based on a comparison of configuration settings of the pre-existing resource to the policy constraints.

18. The system of claim 17, wherein the resource is a database, wherein the configuration settings indicate that the database is stored in a first location, wherein the policy constraints indicate that a database of the given type is to be stored in a second location, and wherein the reconfiguring the resource with the recommended configuration changes comprises:

generating a copy of the database in the second location;

migrating data of the database in the first location to the copy of the database in the second location; and tearing down the database in the first location.

19. The system of claim 14, wherein the resource comprises storage of sensitive information, wherein the configuration settings indicate that the resource accesses a number of applications, wherein the policy constraints indicate that a resource of the given type is to access no more than a predefined number of applications less than the number of applications, and wherein the operations further comprise:

determining, by the policy enforcement application, a ranking of each of the number of applications; and including, in the set of recommended configuration changes, a recommendation to disable access applications having a ranking lower than the predefined number.

20. The system of claim 19, wherein determining the ranking comprises:
   inputting signals corresponding to each application of the number of applications into a supervised machine learning model; and
   receiving, as output from the supervised machine learning model, a given ranking for each of the number of applications.

* * * * *